United States Patent [19]

Bolegoh

[11] Patent Number: 5,262,717
[45] Date of Patent: Nov. 16, 1993

[54] METHOD AND APPARATUS FOR MEASURING ELECTRIC MOTOR EFFICIENCY AND LOADING

[75] Inventor: Gordon S. Bolegoh, Port Hope, Canada

[73] Assignee: Ontario Hydro, Toronto, Canada

[21] Appl. No.: 685,666

[22] Filed: Apr. 16, 1991

[51] Int. Cl.$^5$ ............................................. G01R 31/34
[52] U.S. Cl. ........................ 324/158 MG; 73/862.336
[58] Field of Search ............... 324/158 MG, 160, 162, 324/169, 158 R; 322/99; 318/490, 472; 73/862.19, 168, 659, 862.33; 340/648, 825.15; 364/481

[56] References Cited

U.S. PATENT DOCUMENTS

| | | | |
|---|---|---|---|
| 4,300,078 | 11/1981 | Pascal | 324/158 MG |
| 4,525,763 | 6/1985 | Hardy et al. | 324/158 MG |
| 4,764,720 | 8/1988 | Nystrom | 324/105 |
| 4,888,996 | 12/1989 | Rak et al. | 324/158 MG |
| 4,959,573 | 9/1990 | Roberts | 318/817 |
| 4,965,513 | 10/1990 | Haynes et al. | 324/158 MG |
| 4,991,429 | 2/1991 | Stacey et al. | 324/158 MG |

FOREIGN PATENT DOCUMENTS 0221333 9/1986 European Pat. Off. .

OTHER PUBLICATIONS

Conference Record of 1985 Annual Pulp and Paper Industrial Technical Conference, Apr. 23-26, 1985, Hyatt Regency Hotel, Houston, Tex., pp. 132-137.
T. Gault et al.: 'A Study of Electrical Energy Use by Pumping Systems at the Boise Cascade Mil in Wallula, Wash.' * p. 132, right column, last paragraph—p. 133, left column, last paragraph; FIGS. 1,2*, 1985 IEEE.
Patent Abstract of Japan vol. 12, No. 118 (E-600) Apr. 13, 1988 & JP-A-62 247 785 (Toyota Motor Corporation) Oct. 28, 1987.
Acurex Corporation; "Technical Manual for Model 1200B Universal Data Coupler"; Nov. 1986 pp. 1.1–1.3, 1–10.

Primary Examiner—Vinh Nguyen
Attorney, Agent, or Firm—Ridout & Maybee

[57] ABSTRACT

A method for determining the efficiency and loading of an electric motor comprises affixing a strain gauge to the drive shaft, calibrating the strain gauge, measuring the input power of the motor, measuring the rotational speed of the drive shaft, transmitting an RF signal from the strain gauge through a rotary antenna to a stationary antenna and calculating the torque in the drive shaft under load. An apparatus for carrying out said method includes a device for determining the input power of the motor, a device for determining the rotational speed of the drive shaft, a strain gauge affixed to the draft shaft coupled to an RF transmitter transmitting a signal through a rotary antenna affixed to the drive shaft, and transmitting device coupled to the stationary antenna for transmitting an RF signal to the rotary antenna and receiving an RF signal from the rotary antenna proportional to the amount of strain experienced by the strain gauge. The output power of the motor can thus be determined under load conditions without decoupling the motor from the load, and related to the input power to determine the efficiency of the motor.

16 Claims, 2 Drawing Sheets

METHOD AND APPARATUS FOR MEASURING ELECTRIC MOTOR EFFICIENCY AND LOADING

FIELD OF THE INVENTION

This invention relates to a method and apparatus for measuring the efficiency and loading of an electric motor or other dynamoelectric machine. In particular, this invention relates to a method and portable apparatus for determining the output power of a motor, which can be related to the input power to determine the efficiency of the motor with considerable precision. Power readings may be recorded over an extended period at selected intervals to provide a motor load profile.

BACKGROUND OF THE INVENTION

The energy consumed by electric motors used in industry comprises a high proportion of overall electrical energy consumption. A major cause of excessive energy consumption is the improper sizing of motors to match the load to be driven. Consumption of electricity can therefore be significantly reduced by replacing improperly sized motors with motors which are properly matched to the load. In order to determine where this may be beneficial in a particular case, it is necessary to accurately evaluate the efficiency and loading of an existing motor and thus determine the maximum power required by the process.

Previously there have been four methods typically used to determine the efficiency of an electric motor:

(1) Equivalent circuit test methods—the performance of an electric motor can be calculated from its equivalent electric circuit if all elements in the circuit have been determined from experimental test data. Tests are performed under no-load and load conditions in order to obtain sufficient data for the solution of equivalent circuit network equations in an iterative procedure. Assumed impedances are modified until calculated values of power and power factor agree with measured values.

There is a high probability of error which limits the reliability of this method.

2) Segregated loss methods—this method is based on the premise that motor efficiency is equal to the input power minus losses, divided by the input power. Accurate measurement or estimation of power losses at no-load and full-load conditions can be difficult, particularly in older motors which have suffered some deterioration, and inaccuracies will affect the efficiency of the measurement obtained.

3) Dynamometer measurement—this test method requires the use of a calibrated power-absorbing dynamometer capable of handling the full load of the motor. A torque transducer introduced between the motor and the dynamometer, or a torque arm and load cell, is used for measurement of the reaction torque delivered to the dynamometer. Efficiency is determined directly from the measured output power and the electrical input power. Since the entire output of the motor must be absorbed by the dynamometer, this method is most useful for evaluating motors under 200 horsepower. Furthermore, the motor must be decoupled from its load and coupled to the dynamometer to make this measurement, resulting in considerable expense and down time.

4) Strain gauge torquemeters—in this device a strain gauge is bonded to or embedded in a shaft. Signals from the strain gauge are transmitted to a measuring apparatus using slip rings bonded to the shaft and electrically coupled to stationary brushes. The motor is decoupled from the load, and the torquemeter is coupled between the motor and the load. The signals transmitted by the strain gauge under load are compared to calibrated values and converted to a measurement of torque. To determine efficiency, the motor shaft speed and input power are also measured, and related to the torque measurement as described below. While this method has proved accurate and reliable, considerable expense and down time is encountered in decoupling the motor from the load and introducing the torquemeter.

The present invention provides a strain gauge torquemeter for determining the efficiency and loading of a motor under load conditions, without decoupling the motor from the load. A strain gauge is affixed directly to the motor drive shaft, and signals from the strain gauge are transmitted through a telemetry data coupler requiring no direct connection to the drive shaft. These signals provide an accurate value for torque, which, when multiplied by the motor speed, provides an accurate measurement of the output power of the motor. The motor efficiency can then be determined by dividing the output power by the input power as measured by a power transducer.

SUMMARY OF THE INVENTION

The present invention provides a method for determining the efficiency and/or loading of a motor having a drive shaft connected to a load, comprising affixing a strain gauge to the motor drive shaft and calibrating the strain versus torque relationship using a known dead weight applied over a known length of drive shaft, activating the motor, measuring the power input of the motor, measuring the rotational speed of the drive shaft, transmitting an RF signal from the strain gauge through a rotary antenna to a stationary antenna, and recording a measurement of the torque in the drive shaft under load.

The present invention further provides an apparatus for determining the efficiency and/or loading of a motor having a drive shaft connected to a load, comprising means for determining the input power of the motor, means for determining the rotational speed of the drive shaft, a strain gauge affixed to the drive shaft and coupled to a transmitter transmitting an RF signal through a rotary antenna affixed to the drive shaft, and means coupled to a stationary antenna for receiving an RF signal from the rotary antenna proportional to the amount of strain experienced by the strain gauge.

BRIEF DESCRIPTION OF THE DRAWINGS

In drawings which illustrate by way of example only a preferred embodiment of the invention.

DETAILED DESCRIPTION OF THE INVENTION

Figure 1:
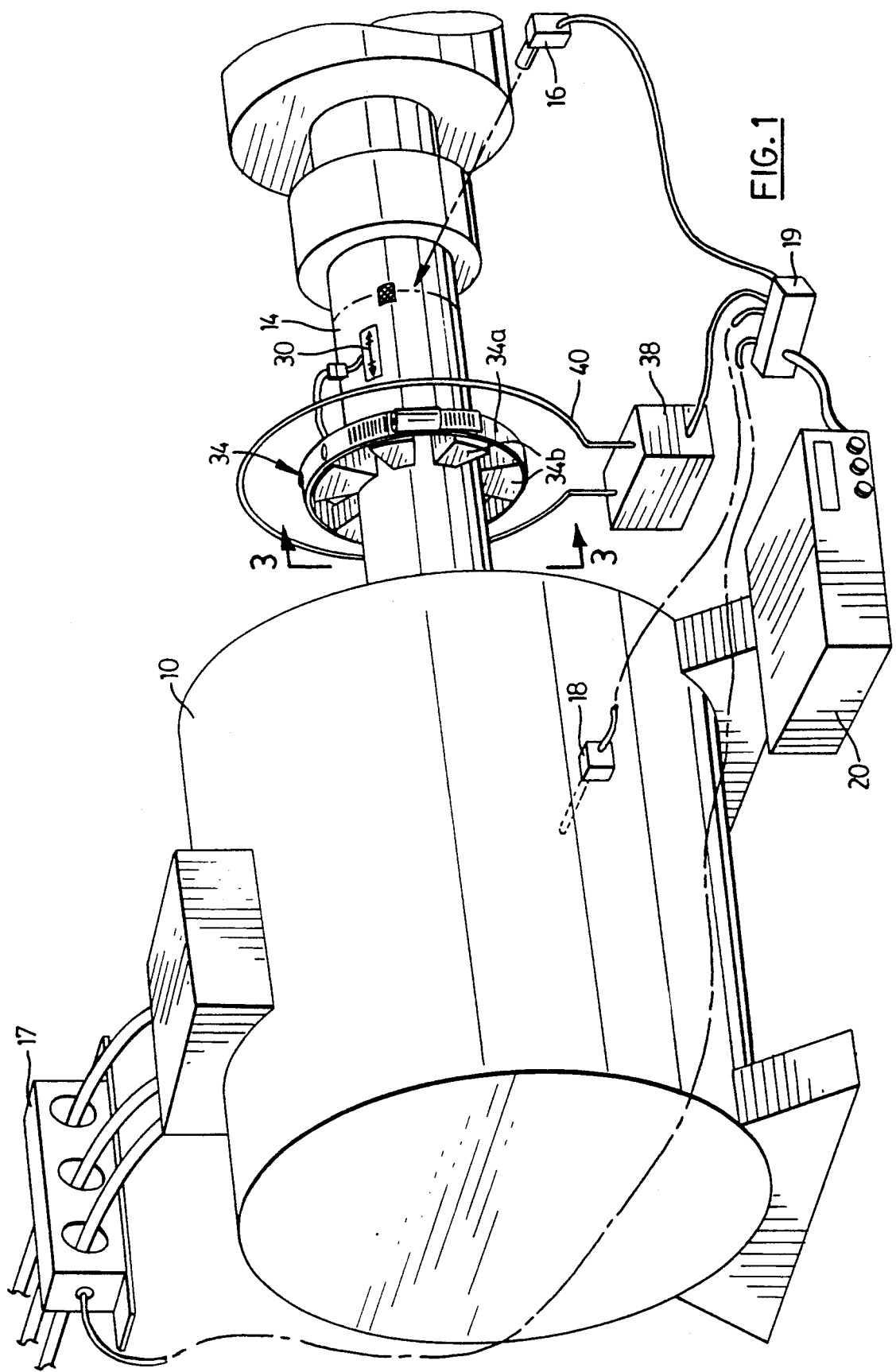
FIG. 1 is an elevation of a load bearing motor incorporating the apparatus of the subject invention.

The efficiency of an electric motor is the quotient obtained by dividing the output power of the motor by its input power. A typical industrial electric motor operates on a three phase alternating current, and the input power (in kilowatts) can accordingly be determined by the equation $$P_{in} = \frac{E \times I \times \sqrt{3} \times P.F.}{1,000}$$

where E is the voltage, I is the amperage and P.F. is the power factor (representing the angular displacement of the current and voltage in each phase of the input signal, i.e. the degree to which the current leads or lags behind the voltage).

The output power (in horsepower) of the motor can be determined by the equation $$P_{out} = \frac{T \times N}{5250}$$

where T is the torque (in lb.ft) and N is the speed (rotations per minute). In this equation $P_{out}$ is converted to kilowatts by multiplying by 0.746.

The present invention combines means for measuring the rotational speed of the motor and means for measuring the torque applied by the motor to the load in order to directly determine the value of $P_{out}$. Once the value of $P_{out}$ has been determined and the value of $P_{in}$ has been measured by a power transducer, the efficiency of the motor can be readily and accurately ascertained.

The input power of the motor $P_{in}$ can be measured with a power transducer 17 utilizing three balanced Hall Effect Sensors, each of which multiplies voltage and current signals in each phase of the input. Such a device is described in U.S. Pat. No. 4,764,720.

Motor speed is determined using a conventional photocell speed sensor 16 located in the vicinity of the drive shaft 14. The output signals from the sensor 16 and the transducer 17 are transmitted through an interface 19 to a data recorder 20 which records the shaft speed and input power.

Figure 2:
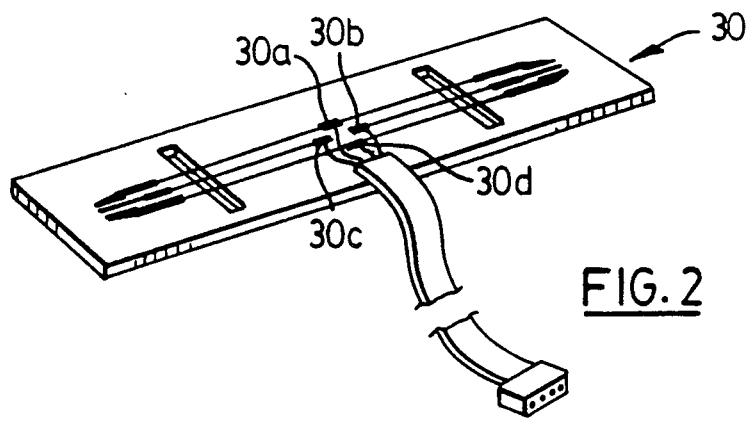
FIG. 2 is a perspective view of the strain gauge illustrated in FIG. 1.

As illustrated in FIG. 1, means for measuring torque utilizes a conventional strain gauge 30 comprising strain gauge elements 30a, 30b, 30c, 30d, shown in FIG. 2, connected in a Wheatstone bridge circuit, attached to or embedded in the drive shaft 14 in the direction of principal stresses. The strain gauge 30 is coupled to an RF transmitter (not shown) located in a collar 34 designed to clamp snugly around the drive shaft 14.

Figure 3:
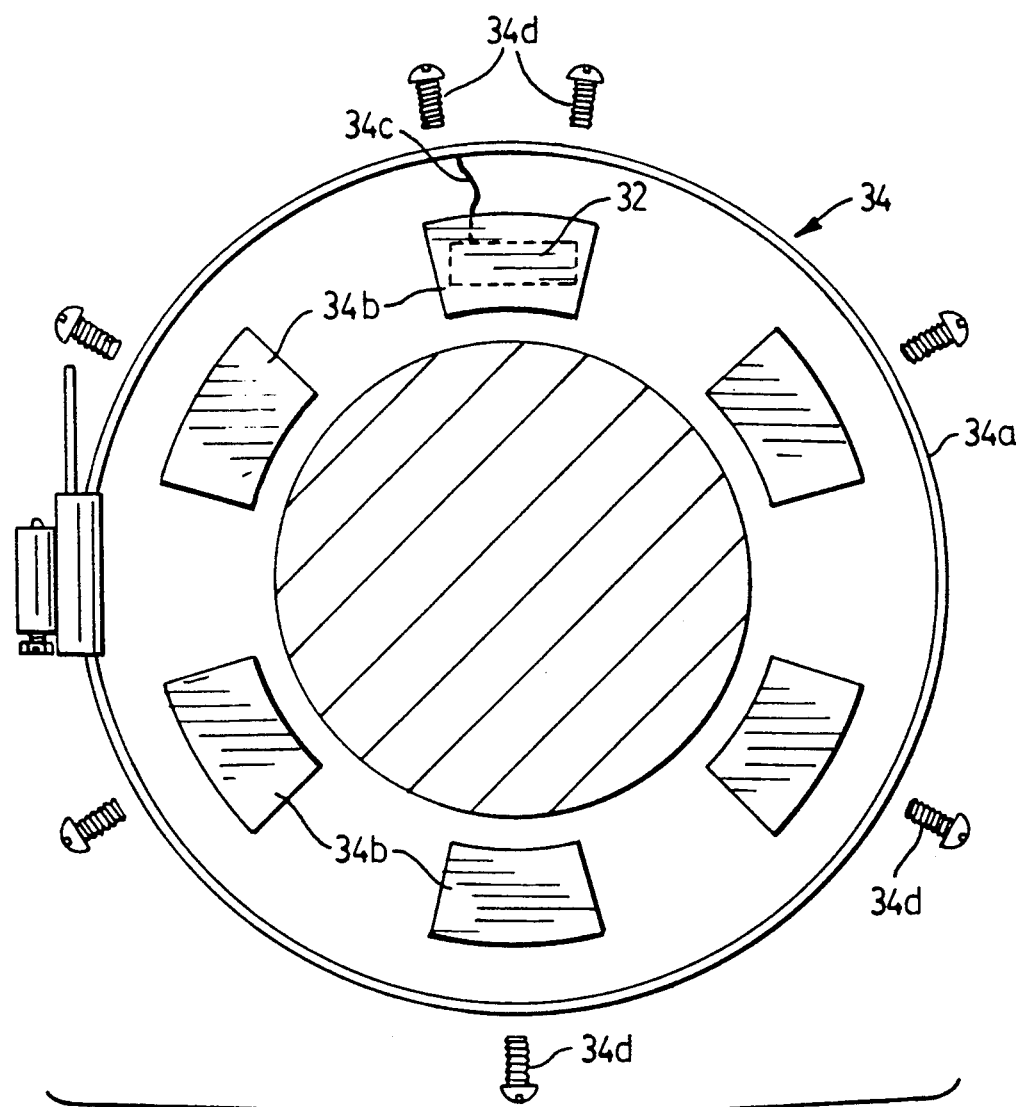
FIG. 3 is an exploded elevation of the collar illustrated in FIG. 1.

The collar 34, illustrated in FIG. 3, preferably comprises a metallic compression clamp 34a spaced from the drive shaft 14 by a series of evenly spaced insulating spacer blocks 34b, to which the clamp 34a is secured by screws 34d. The number of spacer blocks 34b is determined by the size of the drive shaft 14. The transmitter is preferably located in a cavity 32 in one of the spacer blocks 34b, and is electrically coupled to the clamp 34a by a jumper cable 34c. The clamp 34a thus acts as a rotary antenna.

An induction power supply unit 38 broadcasts power to the transmitter and receives an RF signal from the transmitter through a removable stationary antenna 40 encircling the shaft 14 in the vicinity of the collar 34. The strain signal received by the power supply unit 38 is transmitted through the interface 19 to the data recorder 20 and recorded.

It can thus be seen that the apparatus of the invention is fully portable, and can be coupled to a drive shaft 14 easily and quickly without decoupling the motor 10.

A "dead" weight calibration of the drive shaft enables a strain versus torque relationship to be derived. A known dead weight applied over a known length of shaft produces a known torque, which is related to the signal transmitted by the strain gauge 30. Once this relationship has been established and input into the data recorder 20, all strain readings transmitted to the power supply unit 38 may be automatically converted to motor shaft torque and recorded.

For comparison of test data, a thermocouple 18 is placed in close proximity to the stator windings of the motor 10, transmitting a signal through the interface 20 to the data recorder 20 to record the stator temperature for all derived simultaneous measurements.

In operation, the drive shaft 14 is calibrated as described above and the strain versus torque relationship for the specific shaft is input into the data recorder 20. The motor 10 is then activated, and the photosensor 16, thermocouple 18 and power supply unit 38 are activated. Once the motor 10 has reached operating speed, the data recorder 20 is set to begin recording data transmitted by the sensors. The data recorder 20 is set to take readings approximately every fifteen minutes, or at any other selected interval, calculating the power output of the motor from the torque, as derived from signals transmitted by the strain gauge 30, and the shaft speed, as measured by the photosensor 16. The input power is measured concurrently, and a simple calculation which may be performed by the data recorder 20 in known fashion yields the efficiency of the motor.

Preferably the data recorder 20 is provided with sufficient memory capacity to record efficiency and loading data for several weeks, taking readings at the selected interval. A motor load profile can thus be generated. The data recorder 20 may further be adapted to generate graphical displays representing trends of motor efficiency and loading.

I claim:
1. A method for determining the loading of a motor having a drive shaft connected to a load, comprising:
   affixing a strain gauge to the motor drive shaft and calibrating the strain versus torque relationship using a known dead weight applied over a known length of drive shaft to obtain a measure of the strain versus torque relationship,
   using a power transducer to measure the power input $P_{in}$ of the motor under load conditions,
   using a speed sensor to measure the rotational speed N of the drive shaft, and
   transmitting an RF signal from the strain gauge through a rotary antenna to a stationary antenna to obtain a strain reading and dividing the strain reading by the strain versus torque relationship to obtain a measurement of the torque T in the drive shaft under load.

2. The method of claim 1 including the further steps of calculating the efficiency of the motor, and recording efficiency and loading data to provide a motor load profile.

3. The method of claim 2 wherein signals representing the power input, rotational speed of the drive shaft and torque on the drive shaft are electronically recorded and related by a data recorder.

4. The method of claim 3 wherein the signals are recorded in intervals of approximately fifteen minutes.

5. The method of claim 4 including measuring the temperature of stator windings in the motor to ensure that successive load determinations have been calculated under like conditions.

6. The method of claim 1 wherein the rotational speed of the drive shaft is determined using a photosensor.

7. An apparatus for determining the efficiency and/or loading of a motor having a drive shaft connected to a load, the loading being derived from a measurement of torque and the efficiency being derived from a measurement of torque multiplied by the rotational speed of the drive shaft and divided by the input power of the motor, comprising:

means for determining the input power of the motor, means for determining the rotational speed of the drive shaft, a strain gauge for producing a measurement of relative torque affixed to the drive shaft and coupled to an RF transmitter transmitting an RF signal proportional to the amount of strain on the strain gauge through a rotary antenna affixed to the drive shaft, and means coupled to a stationary antenna for receiving the RF signal from the rotary antenna, wherein the transmitter is located in a collar forming a rotary antenna detachably clamped to a the drive shaft, wherein the collar comprises a compression clamp spaced from the drive shaft by insulating spacer blocks, and the transmitter is contained within one of the spacer blocks and electrically coupled to the clamp.

8. The apparatus claimed in claim 7 wherein means for determining the rotational speed of the drive shaft comprises a photosensor.

9. The apparatus claimed in claim 7 including a data recorder for receiving and recording signals produced by the means for determining input power, the means for determining rotational speed of the drive shaft and a strain gauge affixed to the drive shaft for determining torque in the drive shaft.

10. The apparatus claimed in claim 7 including a thermocouple located near stator windings of the motor outputting a signal reflecting the temperature of the stator windings.

11. A method for determining the torque of a motor having a drive shaft connected to a load, comprising:

affixing a strain gauge to the motor drive shaft and calibrating the strain versus torque relationship using a known dead weight applied over a known length of drive shaft to obtain a measure of the strain versus torque relationship, and transmitting an RF signal from the strain gauge through a rotary antenna to a stationary antenna to obtain a measurement of strain and dividing the strain measurement by the strain versus torque relationship to obtain a measurement of the torque T in the drive shaft under load.

12. The method of claim 11 including the further step of recording the torque measurement at intervals to provide a motor load profile.

13. The method of claim 12 wherein signals representing the torque on the drive shaft are electronically recorded by a data recorder.

14. The method of claim 12 wherein the signals are recorded in intervals of approximately fifteen minutes.

15. The method of claim 14 including measuring the temperature of stator windings in the motor to ensure that successive torque measurements have been determined under like conditions.

16. The method of claim 11 wherein rotational speed of the drive shaft is determined using a photosensor.

* * * * *